H. C. Sisco.
Shovel & Tongs.
Nº 75652      Patented Mar. 17, 1868.
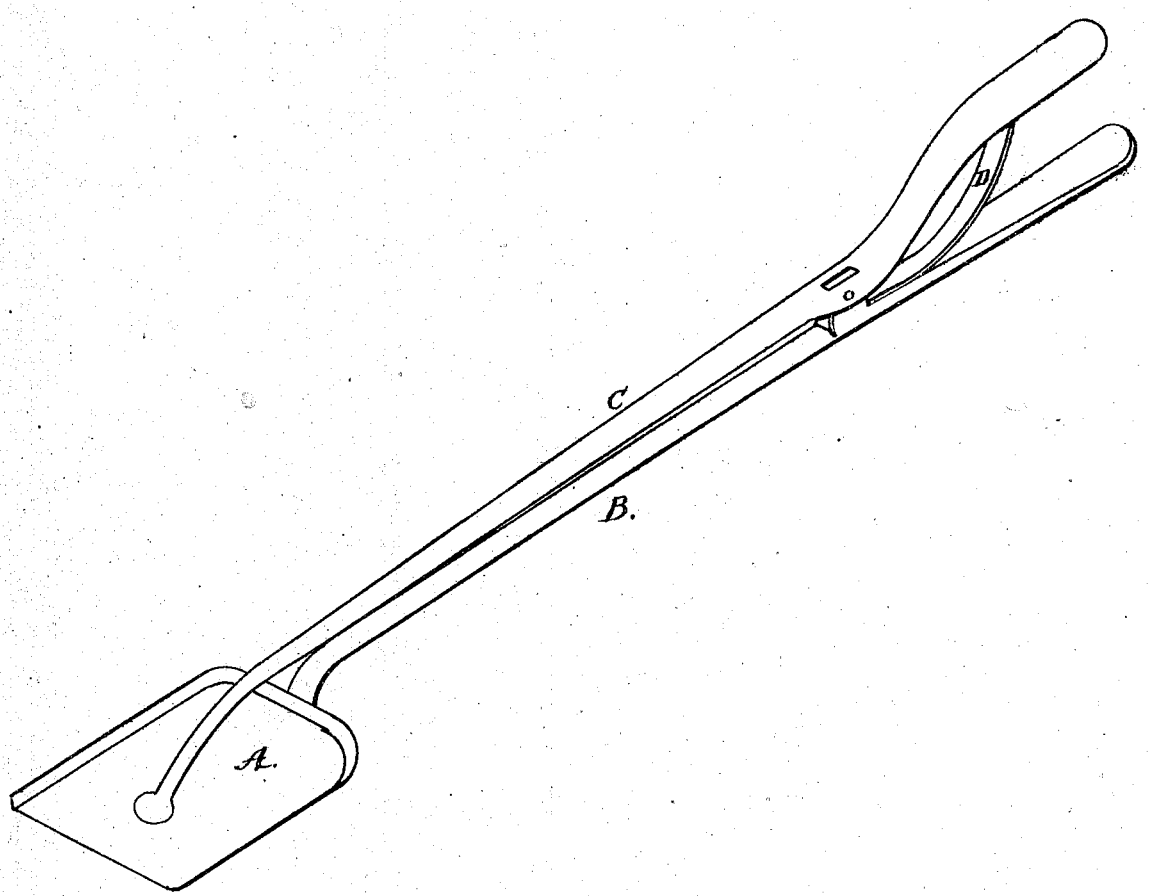
Witnesses;
Stephen Collins
O. F. Mayhew
H. C. Sisco
Inventor.

United States Patent Office.

HENRY C. SISCO, OF INDIANAPOLIS, INDIANA.

Letters Patent No. 75,652, dated March 17, 1868.

COMBINED SHOVEL AND TONGS.

The Schedule referred to in these Letters Patent and making part of the same.

TO ALL WHOM IT MAY CONCERN:

Be it known that I, HENRY C. SISCO, of Indianapolis, in the county of Marion, and State of Indiana, have invented a new and useful Combined Shovel and Tongs; and I do hereby declare that the following is a full, clear, and exact description thereof, reference being had to the accompanying drawing making part of this specification.

This invention relates to the mode of combining a shovel and tongs in one implement, and consists in making the shovel-handle and blade serve as one leg of the tongs, while the other leg is like the ordinary tongs, and is hinged to the shovel-handle near the upper end, leaving sufficient projection above the joint for a hand-hold. A spring between the handles serves to keep the shovel-blade and lower end of the tongs-leg together, and also to hold any article that may be taken up by the implement.

The drawing is a perspective view of the implement.

The following description will enable skilled artisans to make and use my invention:

A is the blade of the shovel, and B the handle. C is a single leg of a tongs, and is hung on a lug projecting from the upper side of the shovel-handle, as shown. The upper ends of the shovel-handle and tongs-leg are flattened and made broad, to form a good hand-hold. A spring, D, is riveted to the shovel-handle above the joint, and serves to keep the shovel-blade and lower end of the tongs-leg together, and also to hold any article that may be taken up by the implement.

The mode of using the implement is too obvious to require other description than to say that it is used for any of the various purposes that either a shovel or tongs is used, and in much the same manner.

A marked advantage of combining the two in the manner here shown consists in the freedom from liability to become so loose in the joint as that the legs will ever slip past each other, as tongs frequently do, making them useless for holding any object, and in the greater safety, as well as convenience, in carrying fire-brands from the stove of one apartment to another, as it combines the safety of the broad shovel-blade with the gripe of the tongs.

Having thus fully described my invention, what I claim as new, and desire to secure by Letters Patent, is—

The shovel and tongs combined in one implement, provided with the spring D, substantially as set forth.

HENRY C. SISCO.

Witnesses:
  O. F. MAYHEW,
  STEPHEN COLLINS.